US012649514B2

(12) United States Patent
    Kimura

(10) Patent No.: US 12,649,514 B2
(45) Date of Patent: Jun. 9, 2026

(54) VEHICULAR STEERING CONTROL DEVICE, STEER-BY-WIRE SYSTEM, AND METHOD FOR CONTROLLING STEER-BY-WIRE SYSTEM

(71) Applicant: HITACHI ASTEMO, LTD., Hitachinaka (JP)

(72) Inventor: Makoto Kimura, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 518 days.

(21) Appl. No.: 18/261,905

(22) PCT Filed: Dec. 17, 2021

(86) PCT No.: PCT/JP2021/046739
    § 371 (c)(1),
    (2) Date: Jul. 18, 2023

(87) PCT Pub. No.: WO2022/158200
    PCT Pub. Date: Jul. 28, 2022

(65) Prior Publication Data
    US 2024/0083493 A1      Mar. 14, 2024

(30) Foreign Application Priority Data
    Jan. 19, 2021      (JP) ................................. 2021-006284

(51) Int. Cl.
    *B62D 5/04*        (2006.01)
    *B62D 5/00*        (2006.01)
    (Continued)

(52) U.S. Cl.
    CPC ............. *B62D 5/046* (2013.01); *B62D 5/006* (2013.01); *B62D 5/0421* (2013.01); (Continued)

(58) Field of Classification Search
    CPC ...... B62D 5/046; B62D 5/006; B62D 5/0421; B62D 15/0215; B62D 15/0225; (Continued)

(56) References Cited

U.S. PATENT DOCUMENTS

2015/0291208 A1* 10/2015 Miyasaka ............ B62D 5/0475
                                                              701/41
2019/0389504 A1   12/2019 Itoh
                                    (Continued)

FOREIGN PATENT DOCUMENTS

CN        113734427 A    12/2021
JP        2020-001477 A    1/2020
                                    (Continued)

OTHER PUBLICATIONS

International Search Report dated Mar. 8, 2022 issued in International Application No. PCT/JP2021/046739, with English translation, 5 pages.
                                    (Continued)

*Primary Examiner* — Joseph J Dallo
(74) *Attorney, Agent, or Firm* — FOLEY & LARDNER LLP

(57)                ABSTRACT

In a vehicular steering control device, a steer-by-wire system, and a method for controlling a steer-by-wire system according to the present invention, if an abnormality of a rotation angle sensor of a turning motor is detected, open-loop control is performed on the turning motor based on a rotation angle of a motor shaft before the abnormality of the rotation angle sensor is detected and information concerning a reaction generation device that applies reaction torque to steering wheel. Consequently, it is possible to continue control of a turning angle even if the rotation angle sensor of the turning motor fails, while suppressing an increase in system cost.

19 Claims, 13 Drawing Sheets

VEHICLE FRONT

(51) Int. Cl.
    _B62D 15/02_ (2006.01)
    _B62D 6/00_ (2006.01)
(52) U.S. Cl.
    CPC ..... _B62D 15/0215_ (2013.01); _B62D 15/0225_
    (2013.01); _B62D 6/008_ (2013.01)
(58) Field of Classification Search
    CPC ...... B62D 6/008; B62D 5/0484; B62D 5/049;
    H02P 29/028
    See application file for complete search history.

(56) References Cited

U.S. PATENT DOCUMENTS

2020/0114961 A1* 4/2020 Suzuki ..................... B60Q 9/00
2020/0114967 A1* 4/2020 Nakajima ............ B62D 15/021
2020/0207408 A1* 7/2020 Nakamura ............. B62D 5/049
2021/0300464 A1* 9/2021 Kodera ................ B62D 5/0487
2022/0063711 A1* 3/2022 Otsuka ................. B62D 5/0463

FOREIGN PATENT DOCUMENTS

WO     WO-2014038452 A1 *  3/2014  .......... G06V 20/588
WO     WO-2014054265 A1 *  4/2014  ............ B62D 5/046

OTHER PUBLICATIONS

International Preliminary Report on Patentability and Written Opinion dated Aug. 3, 2023 issued in International Patent Application No. PCT/JP2021/046739, with English translation, 10 pages.

* cited by examiner

VEHICLE FRONT

TURNING ANGULAR VELOCITY

VEHICLE SPEED

TURNING ANGLE

VEHICULAR STEERING CONTROL DEVICE, STEER-BY-WIRE SYSTEM, AND METHOD FOR CONTROLLING STEER-BY-WIRE SYSTEM

TECHNICAL FIELD

The present invention relates to a vehicular steering control device, a steer-by-wire system, and a method for controlling a steer-by-wire system.

BACKGROUND ART

A steer-by-wire system disclosed by Patent Document 1 compares respective detection values of a first motor rotation angle sensor and a second motor rotation angle sensor corresponding to two systems of an electric motor for turning and a detection value of a turning mount sensor to thereby certify which detection value is inappropriate.

REFERENCE DOCUMENT LIST

Patent Document
    Patent Document 1: JP 2020-001477 A

SUMMARY OF THE INVENTION

Problem to be Solved by the Invention

When a brushless motor is used as a turning motor in a steer-by-wire system including a steering device capable of steering steered wheels (for example, front wheels) by actuating the turning motor, closed-loop control for detecting the rotation angle of a motor shaft (in other words, the rotating position of a rotor) with a sensor and switching an electric current to a coil is performed.

Thus, when the sensor for detecting the rotation angle of the motor shaft fails, it is likely that the closed-loop control is disabled and control of a turning angle corresponding to a steering angle of a steering wheel cannot be continued.

For example, if three sensors for detecting the rotation angle of the motor shaft are provided, it is possible to specify a failed sensor and continue the closed-loop control using normal sensors; however, cost of the steer-by-wire system increases due to an increase in the number of sensors.

The present invention has been made in view of such conventional circumstances, and an object of the present invention is to provide a vehicular steering control device, a steer-by-wire system, and a method for controlling a steer-by-wire system that can continue control of a turning angle even if a rotation angle sensor of a turning motor fails, while suppressing an increase in system cost.

Means for Solving the Problem

According to the present invention, in one aspect of the present invention, a vehicular steering control device, if an abnormality of a rotation angle sensor of a turning motor is detected, performs open-loop control on the turning motor based on a rotation angle of a motor shaft before the abnormality is detected and information concerning a reaction generation device that applies reaction torque to a steering wheel.

Effects of the Invention

According to the present invention, it is possible to continue control of a turning angle even if the rotation angle sensor of the turning motor fails, while suppressing an increase in system cost.

MODE FOR CARRYING OUT THE INVENTION

A vehicular steering control device, a steer-by-wire system, and a method for controlling a steer-by-wire system according to the present invention are explained below with reference to the drawings.

Figure 1:
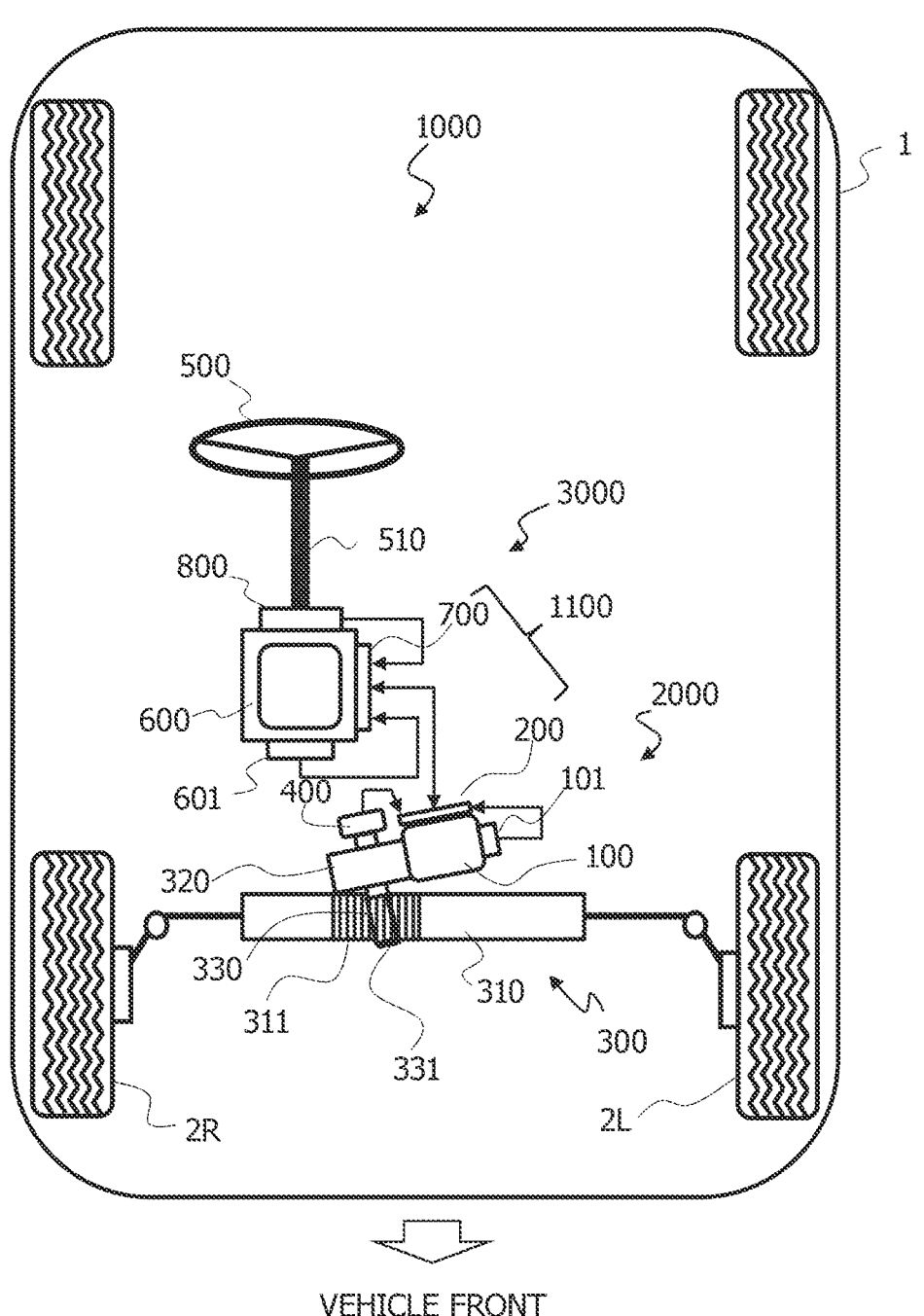
FIG. 1 is a schematic configuration diagram of a steer-by-wire system.

FIG. 1 is a configuration diagram showing an aspect of a steer-by-wire system 1000 included in a vehicle 1 such as an automobile.

Steer-by-wire system 1000 is a steering system that controls a turning angle of steered wheels 2L and 2R, which are front wheels of vehicle 1, according to a steering angle of a steering wheel 500. Steer-by-wire system 1000 includes a steering device 2000 and a reaction generation device 3000.

Steering device 2000 is a device capable of steering steered wheels 2L and 2R by actuating a turning motor 100. Reaction generation device 3000 is a device capable of applying reaction torque to steering wheel 500 by actuating a reaction motor 600. Steering device 2000 and reaction generation device 3000 are mechanically separated.

Steering device 2000 includes turning motor 100 that generates a turning force applied to steered wheels 2L and 2R, a first ECU (Electronic Control Unit) 200 that controls to drive turning motor 100, a turning mechanism 300, and a turning angle sensor 400 for detecting the position of turning mechanism 300 as information concerning a turning angle of steered wheels 2L and 2R.

Turning mechanism 300 is a mechanism that converts a rotational motion of an output shaft of turning motor 100 into a linear motion of a steering rod 310. In this embodiment, a rack and pinion is used as turning mechanism 300.

A rotation driving force of turning motor 100 is transmitted to a pinion shaft 330 via a speed reducer 320.

On the other hand, a rack 311 that meshes with a pinion 331 provided in pinion shaft 330 is provided in steering rod 310.

When pinion 331 rotates, steering rod 310 horizontally moves to the left and the right in a traveling direction of vehicle 1, whereby the turning angle of steered wheels 2L and 2R changes.

Turning angle sensor 400 is configured by a pinion angle sensor for detecting an angle of pinion 331 or a stroke sensor for detecting a movement amount of rack 311.

Turning motor 100 is a brushless motor and includes a turning motor rotation angle sensor 101 capable of detecting a rotation angle (a rotor position) of a motor shaft. Turning motor rotation angle sensor 101 is configured by, for example, a Hall sensor.

First ECU 200 performs closed-loop control for switching an electric current to a coil of turning motor 100 based on the rotation angle detected by turning motor rotation angle sensor 101 so as to control drive turning motor 100.

Note that turning mechanism 300 can, for example, be a mechanism including a ball spring instead of the rack and pinion.

Reaction generation device 3000 (in other words, a steering input device) includes steering wheel 500 operated by a driver of vehicle 1, a steering shaft 510 that rotates according to rotation of steering wheel 500, reaction motor 600 that generates reaction torque applied to steering wheel 500, a second ECU 700 that controls to drive reaction motor 600, and a steering angle sensor 800 for detecting a steering angle of steering wheel 500.

Reaction motor 600 is a brushless motor and includes a reaction motor rotation angle sensor 601 capable of detecting a rotation angle (a rotor position) of a motor shaft.

Second ECU 700 performs closed-loop control for switching an electric current to a coil of reaction motor 600 based on the rotation angle detected by reaction motor rotation angle sensor 601 so as to control drive reaction motor 600.

First ECU 200 and second ECU 700 include microcomputers, respectively. The microcomputer of first ECU 200 and the microcomputer of second ECU 700 communicate with each other via a dedicated communication line. First ECU 200 and second ECU 700 are connected to an in-vehicle communication line such as a Controller Area Network (CAN).

Second ECU 700 calculates a turning angle command value (in other words, a target value of a turning angle) based on the steering angle of steering wheel 500 detected by steering angle sensor 800 and transmits information concerning the calculated turning angle command value to first ECU 200.

First ECU 200 compares the information concerning the turning angle command value acquired from second ECU 700 and information concerning the turning angle (in other words, information concerning an actual turning angle) of steered wheels 2L and 2R detected by turning angle sensor 400 and feedback-controls energization to turning motor 100 such that the actual turning angle approaches the turning angle command value.

Second ECU 700 of reaction generation device 3000 controls energization to reaction motor 600 based on information concerning target reaction torque generated based on, for example, an estimation result of external force applied to turning mechanism 300 and causes reaction motor 600 to generate the target reaction torque.

A control device 1100 that controls a turning angle and steering reaction in steer-by-wire system 1000 is configured by first ECU 200 and second ECU 700.

Figure 2:
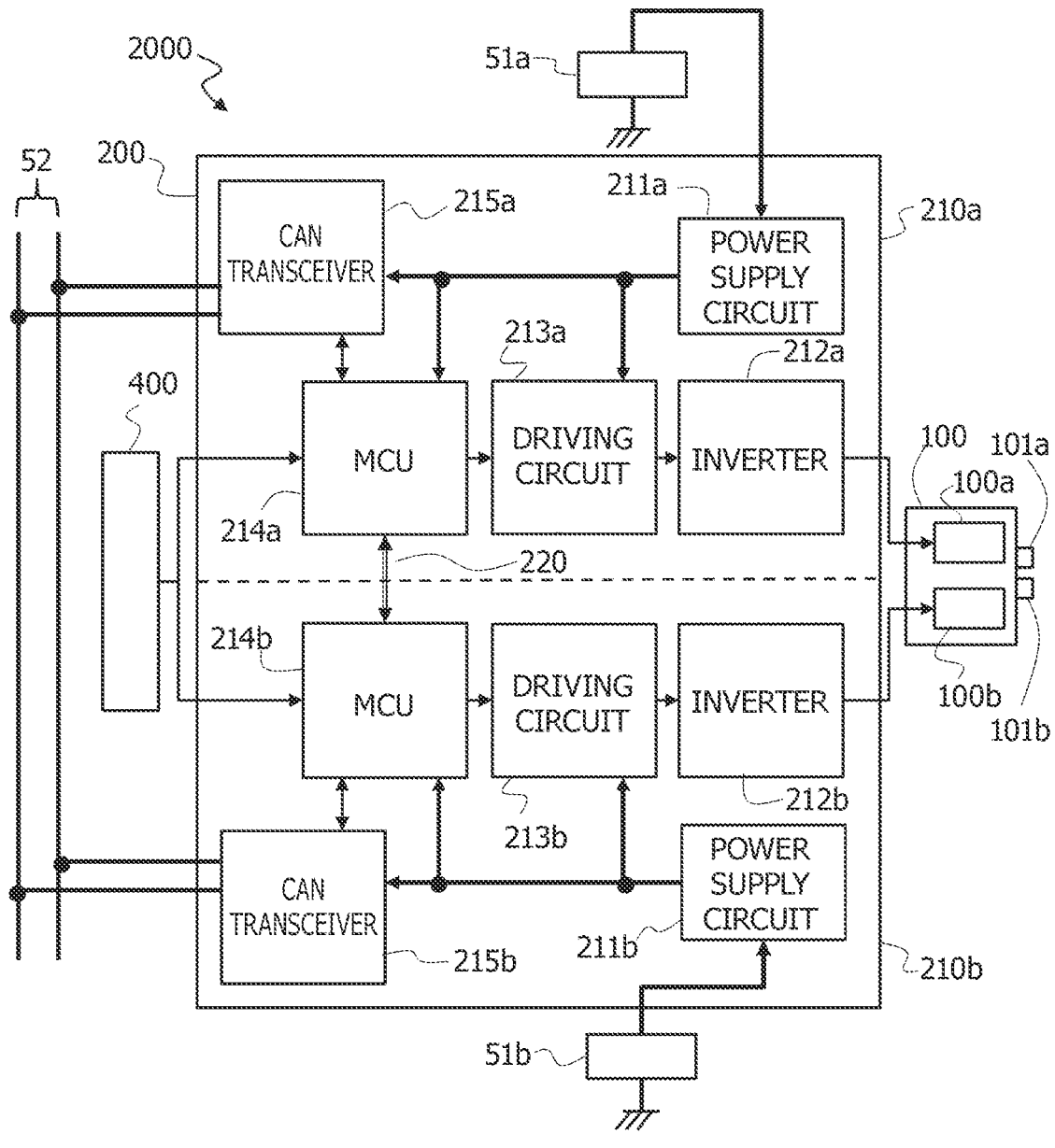
FIG. 2 is a diagram showing hardware of a first ECU that controls a steering device.

FIG. 2 is a diagram showing a configuration of hardware of first ECU 200.

Turning motor 100 that generates a turning force in steering device 2000 is a three-phase brushless motor and includes two sets of a first winding set 100a and a second winding set 100b as winding sets including U-phase coils, V-phase coils, and W-phase coils.

First ECU 200 includes a first driving control system 210a that controls to drive first winding set 100a and a second driving control system 210b that controls to drive second winding set 100b so that a driving control system of turning motor 100 is made redundant.

First driving control system 210a includes a first power supply circuit 211a, a first inverter 212a, a first pre-driver 213a (a first driving circuit), a first MCU (Micro Control Unit) 214a, which is an arithmetic processing device, and a first CAN transceiver 215a.

Similarly, second driving control system 210b includes a second power supply circuit 211b, a second inverter 212b, a second pre-driver 213b (a first driving circuit), a second MCU 214b, which is an arithmetic processing device, and a second CAN transceiver 215b.

First power supply circuit 211a is connected to a first battery 51a.

First power supply circuit 211a converts an input power supply voltage from first battery 51a into a plurality of internal power supply voltages. The plurality of internal power supply voltages are supplied to first pre-driver 213a, first MCU 214a, and first CAN transceiver 215a in first driving control system 210a.

On the other hand, second power supply circuit 211b is connected to a second battery 51b.

Second power supply circuit 211b converts an input power supply voltage from second battery 51b into a plurality of internal power supply voltages. The plurality of internal power supply voltages are supplied to second pre-driver 213b, second MCU 214b, and second CAN transceiver 215b in second driving control system 210b.

First MCU 214a and second MCU 214b perform transmission and reception of information with each other via a communication line 220 and transmit, for example, various kinds of abnormality information in its own system and information concerning inverter control in its own system to other systems.

First CAN transceiver 215a and second CAN transceiver 215b are connected to a vehicle CAN bus 52, which is a communication line in a CAN (Controller Area Network) communication scheme.

First ECU 200 communicates with other electronic control devices including second ECU 700 via vehicle CAN bus 52. Second ECU 700 communicates with other electronic control devices including first ECU 200 via vehicle CAN bus 52.

First MCU 214a and second MCU 214b respectively acquire a signal concerning a turning angle output by turning angle sensor 400, acquire, for example, information concerning a steering angle of steering wheel 500 from second ECU 700 via vehicle CAN bus 52, and control energization to winding sets 100a and 100b based on such information.

First MCU 214a and second MCU 214b control, according to the energization control to winding sets 100a and 100b, a turning angle of steered wheels 2L and 2R to a target value corresponding to the steering angle of steering wheel 500.

Furthermore, turning motor rotation angle sensor 101 is a redundant sensor including a plurality of sensors and is configured by a first rotation angle sensor 101a and a second rotation angle sensor 101b.

First MCU 214a and second MCU 214b carry out closed-loop control for switching electric currents to winding sets 100a and 100b based on signals from turning motor rotation angle sensor 101 (first rotation angle sensor 101a and second rotation angle sensor 101b).

First MCU 214a and second MCU 214b compare a detection value of first rotation angle sensor 101a and a detection value of second rotation angle sensor 101b and diagnose presence or absence of a failure of turning motor rotation angle sensor 101.

Figure 3:
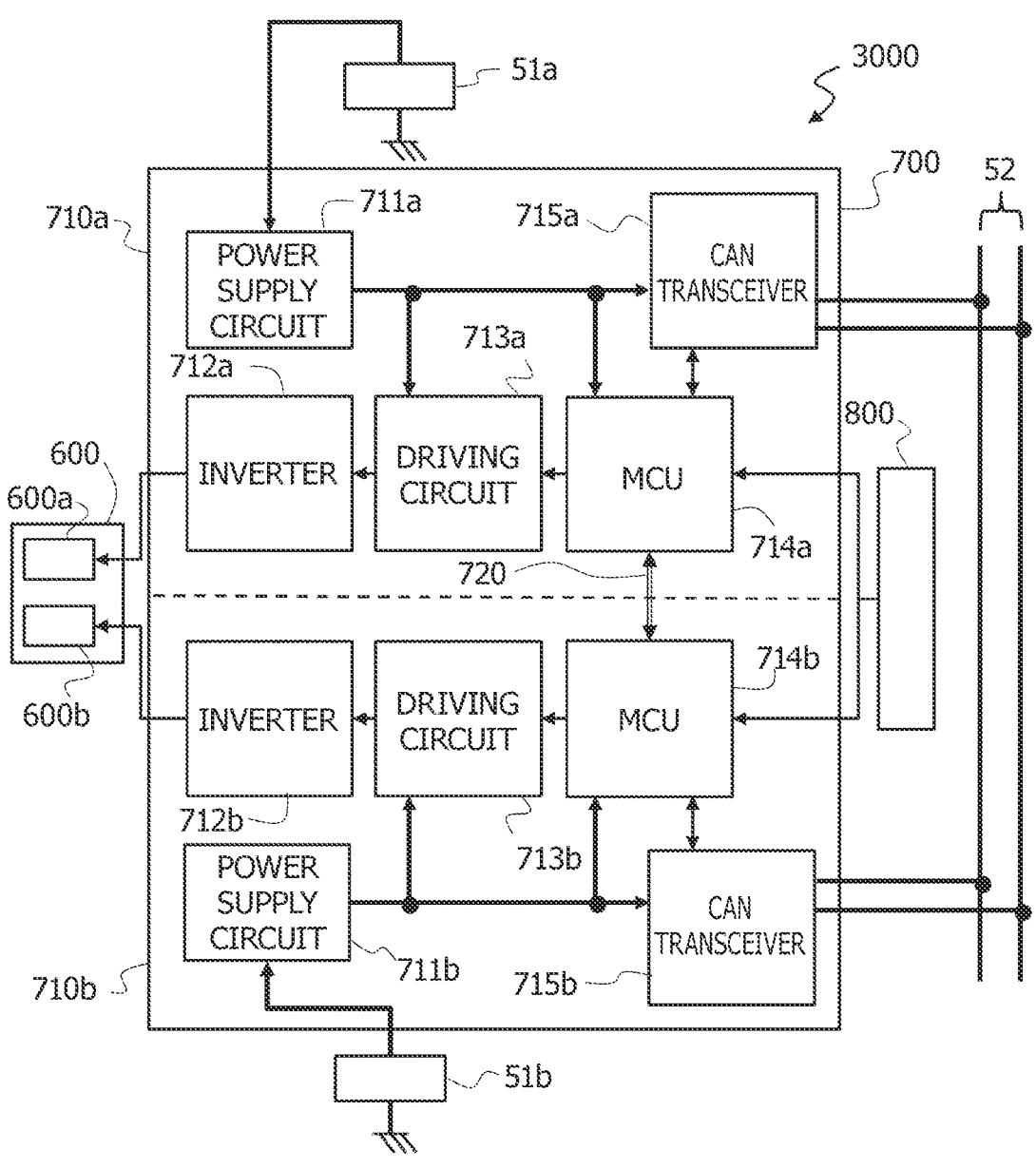
FIG. 3 is a diagram showing hardware of a second ECU that controls a reaction generation device.

FIG. 3 is a diagram showing a configuration of hardware of second ECU 700.

Note that a driving control system of reaction motor 600 in reaction generation device 3000 is also made redundant as is the case with the driving control system of turning motor 100 in steering device 2000.

Reaction motor 600 is a three-phase brushless motor as is the case with turning motor 100 and includes two sets of a first winding set 600a and a second winding set 600b as winding sets including U-phase coils, V-phase coils, and W-phase coils.

Second ECU 700 includes a first driving control system 710a that controls to drive first winding set 600a and a second driving control system 710b that controls to drive second winding set 600b so that the driving control system of reaction motor 600 is made redundant.

First driving control system 710a includes a first power supply circuit 711a, a first inverter 712a, a first pre-driver 713a (a first driving circuit), a first MCU 714a, and a first CAN transceiver 715a.

Similarly, second driving control system 710b includes a second power supply circuit 711b, a second inverter 712b, a second pre-driver 713b (a second driving circuit), a second MCU 714b, and a second CAN transceiver 715b.

First power supply circuit 711a is connected to first battery 51a.

First power supply circuit 711a converts an input power supply voltage from first battery 51a into a plurality of internal power supply voltages. The plurality of internal power supply voltages are supplied to first pre-driver 713a, first MCU 714a, and first CAN transceiver 715a in first driving control system 710a.

Second power supply circuit 711b is connected to second battery 51b.

Second power supply circuit 711b converts an input power supply voltage from second battery 51b into a plurality of internal power supply voltages. The plurality of internal power supply voltages are supplied to second pre-driver 713b, second MCU 714b, and second CAN transceiver 715b in second driving control system 710b.

First MCU 714a and second MCU 714b perform transmission and reception of information with each other via a communication line 720 and transmit, for example, various kinds of abnormality information in its own system and information concerning inverter control in its own system to other systems.

First CAN transceiver 715a and second CAN transceiver 715b are connected to vehicle CAN bus 52.

First MCU 714a and second MCU 714b respectively acquire a signal concerning a steering angle of steering wheel 500 output by steering angle sensor 800, calculate a turning angle command value based on information concerning the steering angle, and transmit information concerning the turning angle command value to first ECU 200 of steering device 2000 via vehicle CAN bus 52.

First MCU 714a and second MCU 714b respectively acquire information concerning a target value of steering reaction from steering device 2000 via vehicle CAN bus 52 and control energization to winding sets 600a and 600b based on the acquired information to control steering reaction generated by reaction motor 600.

Note that reaction motor 600 includes a rotation angle sensor (not shown) for detecting a rotation angle of the motor shaft of reaction motor 600. First MCU 714a and second MCU 714b carry out the closed-loop control of reaction motor 600 for switching electric currents to winding sets 600a and 600b based on a detection value of the rotation angle of reaction motor 600.

Figure 4:
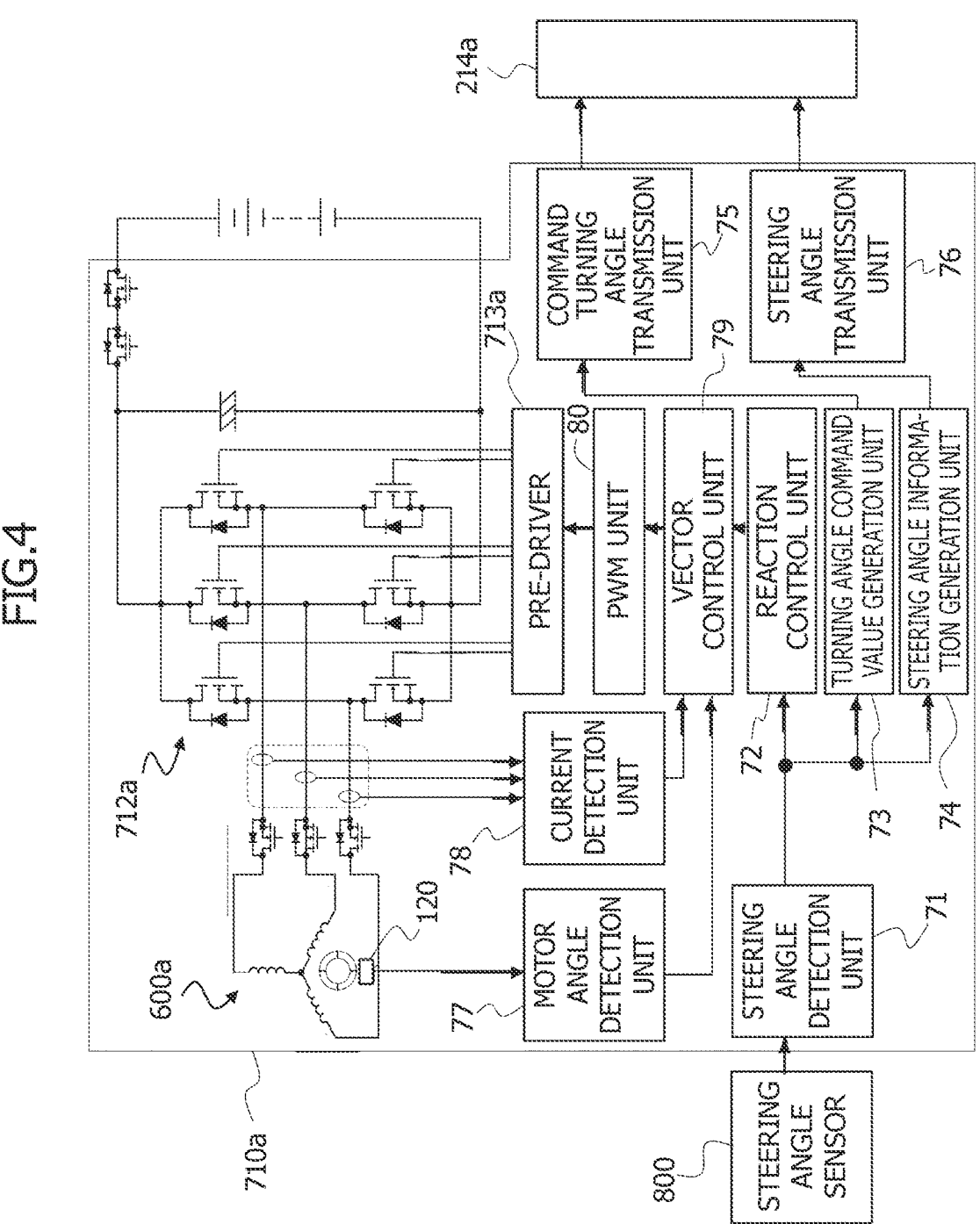
FIG. 4 is a block diagram showing a control function of the second ECU.

FIG. 4 is a block diagram showing a control function of first MCU 714a of first driving control system 710a of second ECU 700.

Note that second MCU 714b of second driving control system 710b has the same control function as the control function of first MCU 714a. Therefore, in FIG. 4, illustration of second driving control system 710b is omitted.

A steering angle detection unit 71 acquires a signal output by steering angle sensor 800 and detects a steering angle of steering wheel 500 based on the acquired signal.

Steering angle detection unit 71 transmits information concerning the steering angle of steering wheel 500 to each of a reaction control unit 72, a turning angle command value generation unit 73, and a steering angle information generation unit 74.

Reaction control unit 72 calculates target reaction torque from, for example, the information concerning the steering angle of steering wheel 500.

Turning angle command value generation unit 73 calculates a turning angle command value based on the information concerning the steering angle of steering wheel 500 and a setting value of a steering gear ratio and transmits information concerning the calculated turning angle command value to a command turning angle information transmission unit 75.

Command turning angle information transmission unit 75 transmits the information concerning the turning angle command value to first MCU 214a of first driving control system 210a of first ECU 200.

Steering angle information generation unit 74 generates information concerning the steering angle (or steering angular velocity) of steering wheel 500 transmitted to first driving control system 210a of first ECU 200.

A steering angle information transmission unit 76 transmits the information concerning the steering angle (or the steering angular velocity) of steering wheel 500 generated by steering angle information generation unit 74 to first MCU 214a of first driving control system 210a of first ECU 200 as information concerning reaction generation device 3000.

On the other hand, a motor angle detection unit 77 acquires a signal of a rotation angle sensor 120 for detecting a rotation angle of the motor shaft (a rotating position of a rotor and a magnetic pole position) of reaction motor 600 and detects the rotation angle of the motor shaft of reaction motor 600.

A current detection unit 78 detects each of driving currents (phase currents) flowing to phases (a U phase, a V phase, and a W phase) of reaction motor 600.

A vector control unit 79 acquires information concerning the target reaction torque from reaction control unit 72, acquires information concerning the rotation angle of the motor shaft of reaction motor 600 from motor angle detection unit 77, further acquires information concerning the phase currents from current detection unit 78, and calculates a d-axis voltage command value Vd and a q-axis voltage command value Vq with a vector control scheme based on such information.

Specifically, vector control unit 79 converts an actual current of each of the three-phases into a d-axis actual current and a q-axis actual current and calculates d-axis voltage command value Vd and q-axis voltage command value Vq according to deviations between a d-axis current command value and a q-axis current command value corresponding to the target reaction torque and the d-axis actual current and the q-axis actual current.

Furthermore, vector control unit 79 converts d-axis voltage command value Vd and q-axis voltage command value Vq into three-phase command voltages Vu, Vv, and Vw based on the rotation angle of the motor shaft of reaction motor 600 and outputs three-phase command voltages Vu, Vv, and Vw to a PWM generation unit 80.

PWM generation unit 80 outputs a control pulse for controlling on and off of switching elements of inverter 712a with PWM based on three-phase command voltages Vu, Vv, and Vw to pre-driver 713a.

Figure 5:
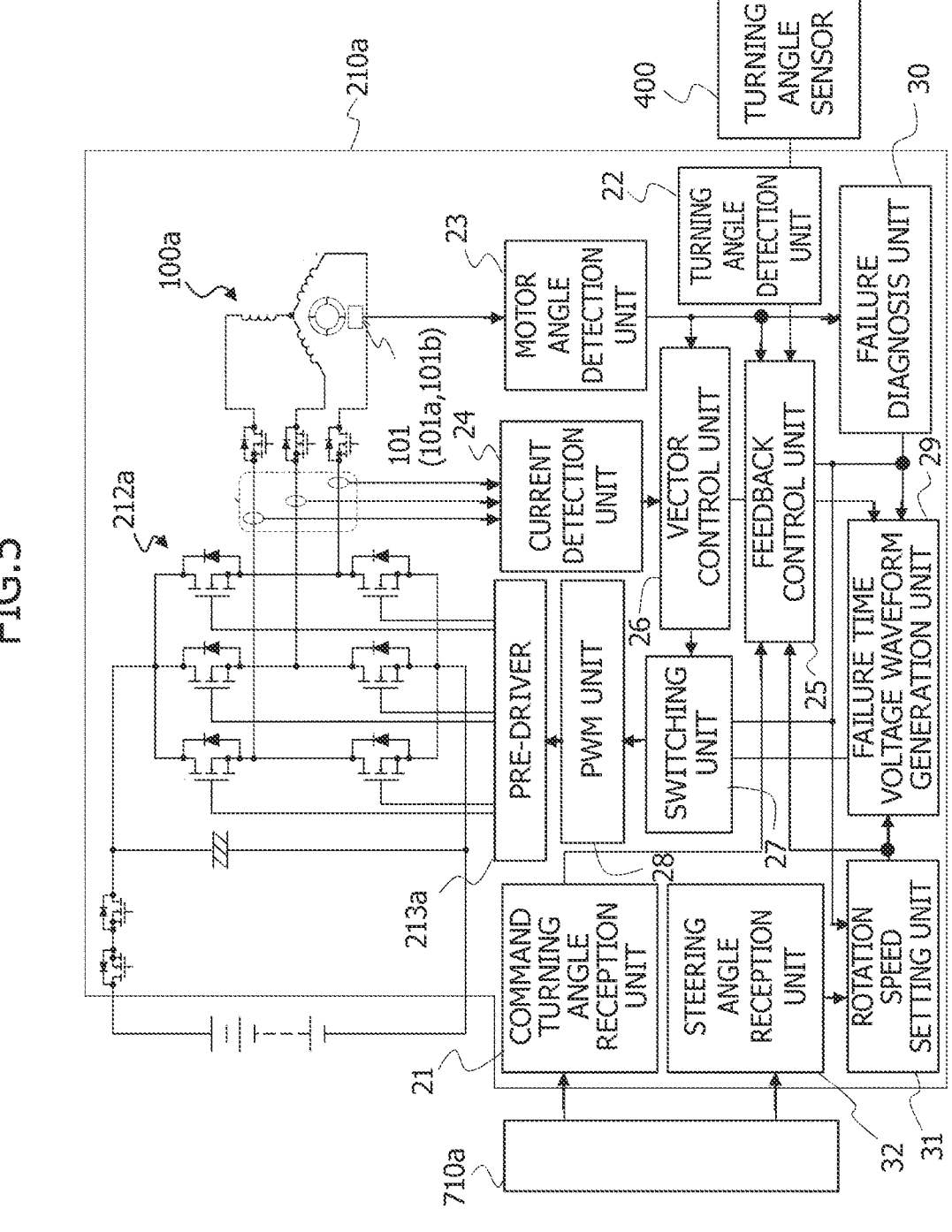
FIG. 5 is a block diagram showing a control function of the first ECU.

FIG. 5 is a block diagram showing a control function of first MCU 214a of first driving control system 210a of first ECU 200.

Note that second MCU 214b has the same control function as the control function of first MCU 214a. Therefore, in FIG. 5, illustration of second driving control system 210b is omitted.

Command turning angle information reception unit 21 acquires information concerning a turning angle command value from command turning angle information transmission unit 75 of first driving control system 710a of second ECU 700.

A turning angle detection unit 22 acquires a signal output by turning angle sensor 400 and detects a turning angle of steered wheels 2L and 2R.

A motor angle detection unit 23 acquires a signal of turning motor rotation angle sensor 101 (first rotation angle sensor 101a and second rotation angle sensor 101b) for detecting a rotation angle of the motor shaft (a rotating position of a rotor and a magnetic pole position) of turning motor 100 and detects the rotation angle of the motor shaft of turning motor 100.

A current detection unit 24 detects each of electric currents (phase currents) flowing to phases (a U phase, a V phase, and a W phase) of turning motor 100.

A feedback control unit 25 acquires information concerning the turning angle command value (a target value) from command turning angle information reception unit 21, acquires information concerning the turning angle (an actual turning angle) of steered wheels 2L and 2R from turning angle detection unit 22, and acquires information concerning the rotation angle of the motor shaft of turning motor 100 from motor angle detection unit 23.

Feedback control unit 25 calculates target turning torque for causing the actual turning angle to approach the turning angle commend value (in other words, a target value of the turning angle).

A vector control unit 26 acquires information concerning the target turning torque from feedback control unit 25, acquires the information concerning the rotation angle of the motor shaft of turning motor 100 from motor angle detection unit 23, further acquires information concerning the phase currents from current detection unit 24, and calculates d-axis voltage command value Vd and q-axis voltage command value Vq with the vector control scheme.

Specifically, vector control unit 26 calculates d-axis voltage command value Vd and q-axis voltage command value Vq according to deviations between a d-axis current command value and a q-axis current command value corresponding to the target turning torque and a d-axis actual current and a q-axis actual current calculated by converting actual phase currents of three phases.

Furthermore, vector control unit 26 converts d-axis voltage command value Vd and q-axis voltage command value Vq into three-phase command voltages Vu, Vv, and Vw based on the information concerning the rotation angle of the motor shaft of turning motor 100 and outputs the three-phase command voltages Vu, Vv, and Vw.

A PWM generation unit 28 outputs a control command for controlling on and off of switching elements of inverter 212a with PWM based on the three-phase command voltages Vu, Vv, and Vw to pre-driver 213a.

A driving signal switching unit 27 disposed in a pre-stage of PWM generation unit 28 selects one of a command voltage from vector control unit 26 and a command voltage from a failure voltage waveform generation unit 29 according to presence or absence of an abnormality of turning motor rotation angle sensor 101 and outputs the selected command voltage to PWM generation unit 28.

As explained below, when turning motor rotation angle sensor 101 is abnormal, failure voltage waveform generation unit 29 generates a voltage waveform by open-loop control based on a motor rotation angle detected by turning motor rotation angle sensor 101 before an abnormality is detected and information (specifically, a steering angle or steering angular velocity) concerning reaction generation device 3000.

If turning motor rotation angle sensor 101 is normal, driving signal switching unit 27 outputs a command voltage by the closed-loop control generated by vector control unit 26 to PWM generation unit 28. If turning motor rotation angle sensor 101 is abnormal, driving signal switching unit 27 outputs a command voltage by the open-loop control generated by failure voltage waveform generation unit 29 to PWM generation unit 28.

In other words, driving signal switching unit 27 switches the closed-loop control and the open-loop control according to presence or absence of an abnormality of turning motor rotation angle sensor 101.

A failure diagnosis unit 30 acquires information concerning a motor rotation angle detection value, that is, a rotation angle detection value of first rotation angle sensor 101*a* and a rotation angle detection value of second rotation angle sensor 101*b* from motor angle detection unit 23.

Failure diagnosis unit 30 compares the rotation angle detection value of first rotation angle sensor 101*a* and the rotation angle detection value of second rotation angle sensor 101*b*, and if the rotation angle detection values coincide, determines that turning motor rotation angle sensor 101 is normal, and if the rotation angle detection values do not coincide, determines that turning motor rotation angle sensor 101 is out of order, and transmits information concerning a diagnosis result to feedback control unit 25 and failure voltage waveform generation unit 29.

A steering angle information reception unit 32 acquires information concerning a steering angle (or steering angular velocity) of steering wheel 500 from steering angle information transmission unit 76 of first MCU 714*a* of reaction generation device 3000.

A motor rotation speed setting unit 31 sets a command value (a target value) of rotation speed of turning motor 100 based on the information concerning the steering angle (or the steering angular velocity) of steering wheel 500 acquired by steering angle information reception unit 32, in other words, the information concerning reaction generation device 3000.

Failure voltage waveform generation unit 29 acquires the rotation speed command value set by motor rotation speed setting unit 31, the diagnosis result of turning motor rotation angle sensor 101 (presence or absence of an abnormality of turning motor rotation angle sensor 101) in failure diagnosis unit 30, control information of feedback control unit 25, and the like.

When an abnormality has occurred in turning motor rotation angle sensor 101 and the closed-loop control cannot be executed, failure voltage waveform generation unit 29 generates a voltage waveform for performing the open-loop control on turning motor 100 and outputs the voltage waveform to driving signal switching unit 27.

Figure 6:
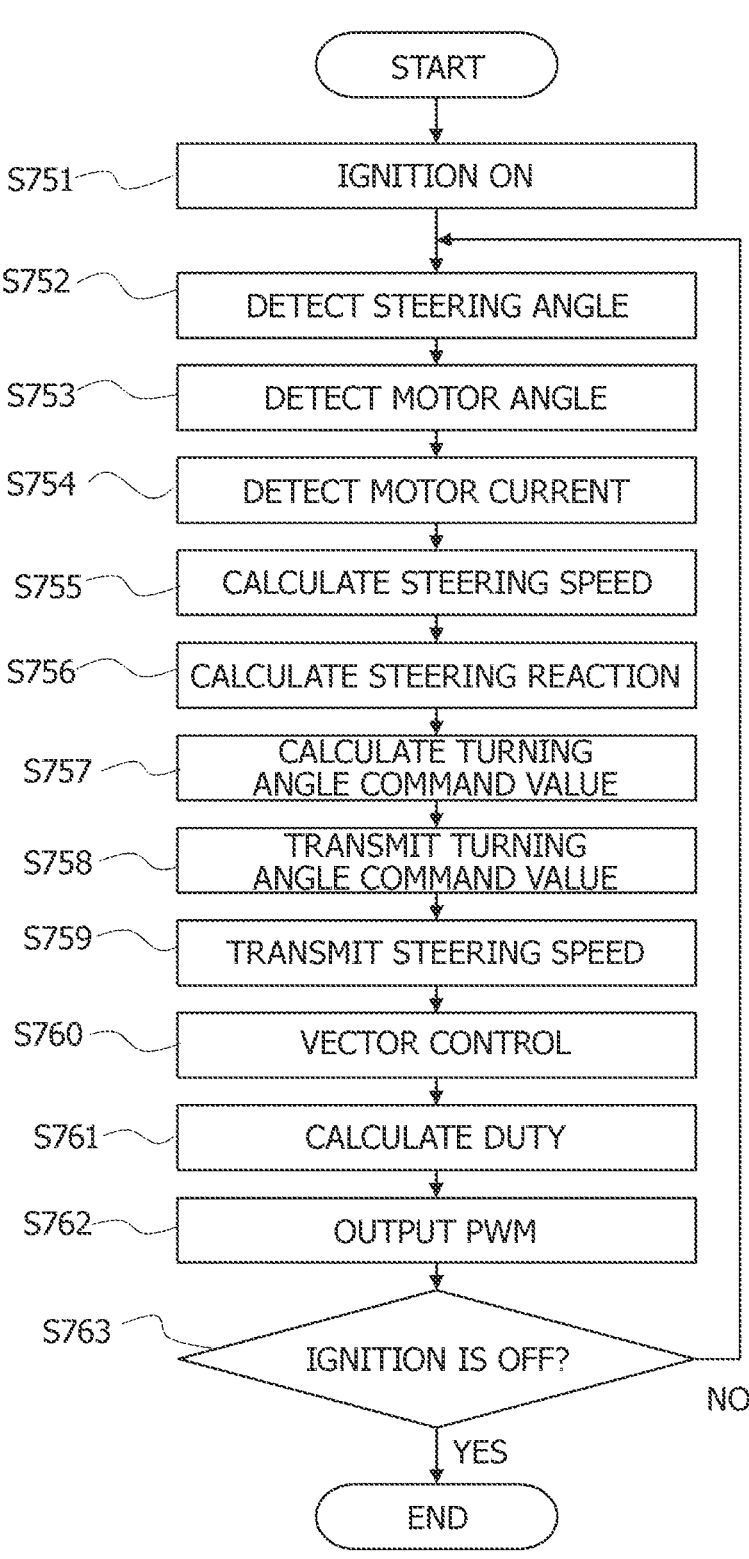
FIG. 6 is a flowchart showing a control procedure of the second ECU.

FIG. 6 is a flowchart showing a control process in second ECU 700 of reaction generation device 3000, that is, a control procedure of reaction motor 600.

Note that the control process shown in the flowchart of FIG. 6 is executed in parallel in first MCU 714*a* of first driving control system 710*a* and second MCU 714*b* of second driving control system 710*b*.

In step S751, second ECU 700 starts according to ON operation of an ignition switch, which is the main switch for operating and stopping vehicle 1.

Second ECU 700 detects a steering angle of steering wheel 500 from an output of steering angle sensor 800 in step S752, detects a rotation angle of the motor shaft of reaction motor 600 from an output of rotation angle sensor 120 in step S753, and detects a motor current (specifically, phase currents) of reaction motor 600 in step S754.

Subsequently, second ECU 700 calculates steering angular velocity of steering wheel 500 in step S755, calculates a command value of steering reaction (reaction torque) in step S756, and further calculates a turning angle command value for steered wheels 2L and 2R from information concerning the steering angle of steering wheel 500 in step S757.

Subsequently, second ECU 700 transmits information concerning the turning angle command value to first ECU 200 of steering device 2000 in step S758 and transmits information concerning the steering angular velocity of steering wheel 500 to first ECU 200 of steering device 2000 in step S759.

Here, second ECU 700 may transmit the information concerning the steering angle of steering wheel 500 to first ECU 200 so that first ECU 200 calculates the steering angular velocity.

In step S760, second ECU 700 calculates, with vector control, voltage command values of phases according to the command value of the steering reaction and the rotation angle of the motor shaft of reaction motor 600.

Subsequently, second ECU 700 determines a duty ratio in PWM control of inverters 712*a* and 712*b* based on the voltage command values of the phases in step S761, and in the next step S762, outputs a pulse signal for turning on and off switching elements of inverters 712*a* and 712*b* and drives reaction motor 600.

Second ECU 700 discriminates ON and OFF of the ignition switch in step S763.

Second ECU 700 returns to step S752 and repeatedly executes a control process of step S752 to step S762 if the ignition switch is on and ends the control process if the ignition switch is off.

Figure 7:
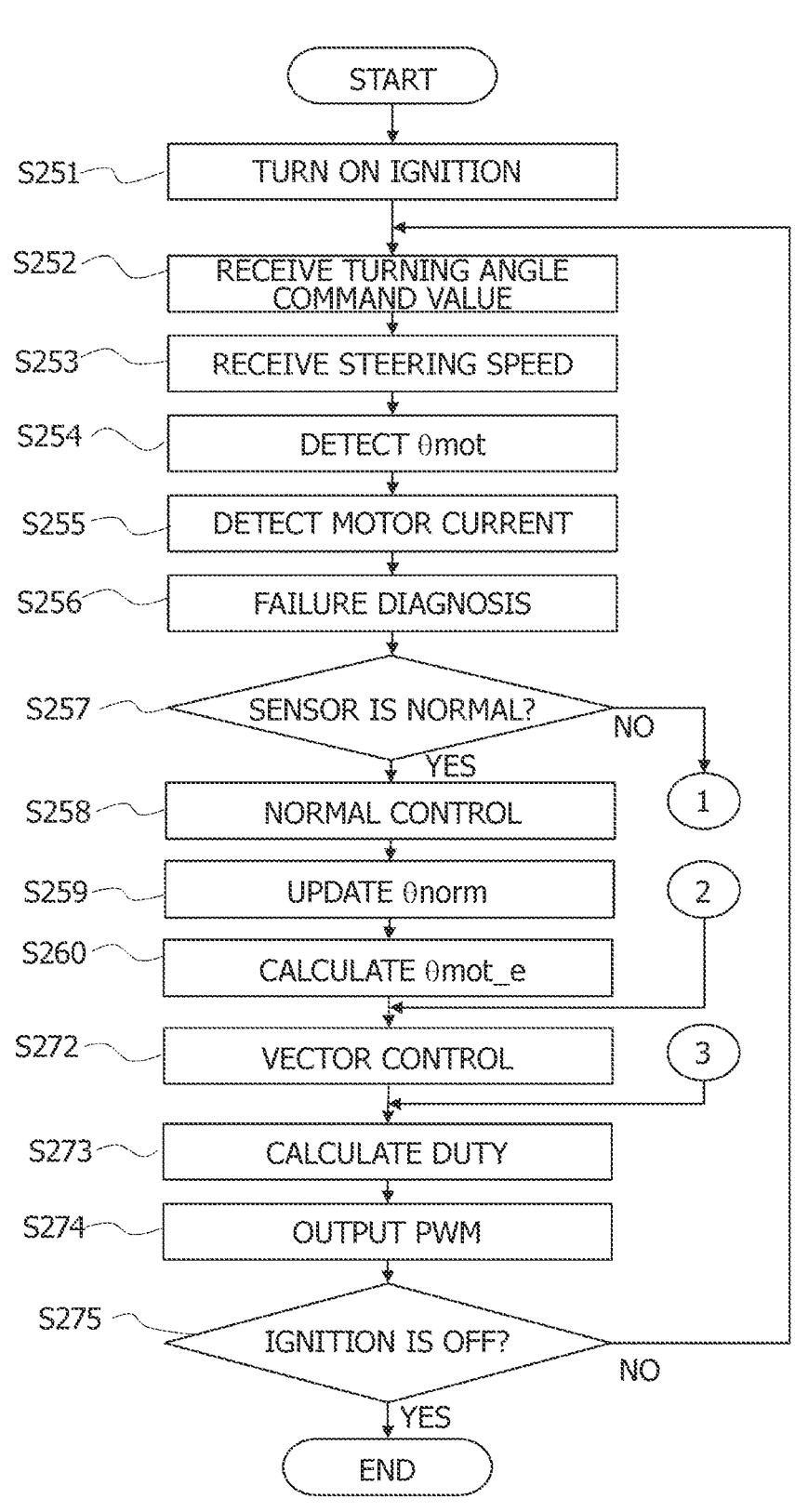
FIG. 7 is a flowchart showing a control procedure of the first ECU.
Figure 8:
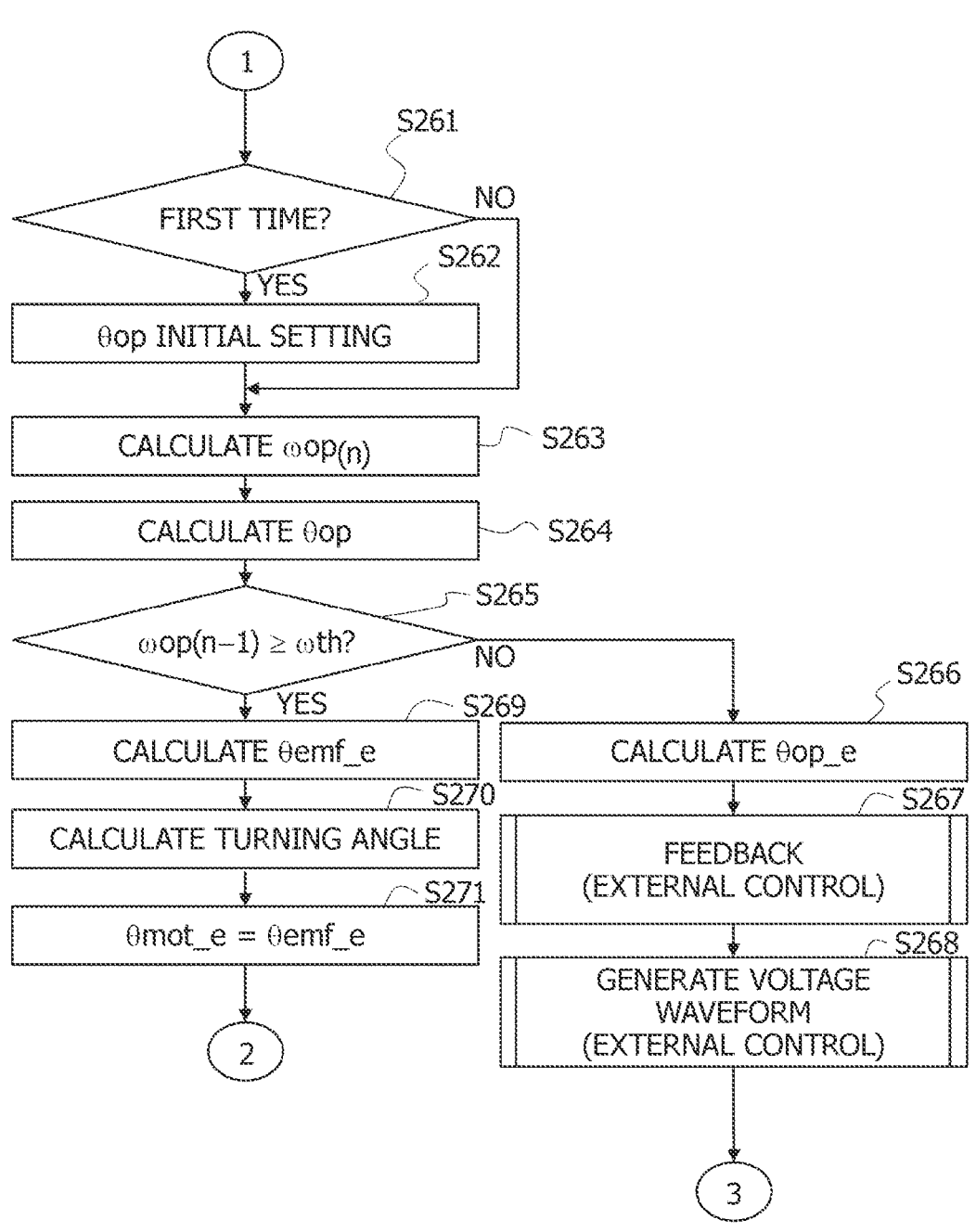
FIG. 8 is a flowchart showing the control procedure of the first ECU.

FIGS. 7 and 8 are flowcharts showing a control process in first ECU 200 of steering device 2000, that is, a control procedure of turning motor 100.

Note that the control process shown in the flowcharts of FIGS. 7 and 8 is executed in parallel in first MCU 214*a* of first driving control system 210*a* and second MCU 214*b* of second driving control system 210*b*.

First ECU 200 starts according to ON operation of the ignition switch in step S251.

First ECU 200 acquires information concerning a turning angle command value from second ECU 700 in step S252 and acquires information concerning steering angular velocity (or a steering angle) from second ECU 700 in the next step S253.

First ECU 200 detects a rotation angle θmot of the motor shaft of turning motor 100 based on an output of turning motor rotation angle sensor 101 in step S254 and detects a motor current (phase currents) of turning motor 100 in step S255.

Subsequently, first ECU 200 carries out a failure diagnosis for turning motor rotation angle sensor 101 in step S256.

Turning motor rotation angle sensor 101 is made redundant and is configured by first rotation angle sensor 101*a* and second rotation angle sensor 101*b*.

Therefore, as the failure diagnosis for turning motor rotation angle sensor 101, first ECU 200 compares a detection result of first rotation angle sensor 101*a* and a detection result of second rotation angle sensor 101*b*. First ECU 200 determines that turning motor rotation angle sensor 101 is normal if the detection results coincide with each other and determines that turning motor rotation angle sensor 101 is out of order if the detection results do not coincide with each other.

Note that a diagnosis method of turning motor rotation angle sensor 101 is not limited to comparison of outputs of two sensors. First ECU 200 can detect an abnormality of turning motor rotation angle sensor 101 through a diagnosis of a sensor inside, detection of a communication failure, and the like.

In the next step S257, first ECU 200 discriminates a result of the failure diagnosis for turning motor rotation angle sensor 101.

If normality of turning motor rotation angle sensor 101 is detected, first ECU 200 proceeds to step S258 and subsequent steps and executes normal control for driving turning motor 100 with the closed-loop control for switching an electric current to the coil based on a motor rotation angle detected by turning motor rotation angle sensor 101.

In step S258, first ECU 200 executes, for example, steering angle feedback control for calculating a target value (a motor torque command value) of turning torque (generation torque of turning motor 100) based on a deviation between information concerning a turning angle command value and information concerning an actual turning angle.

Subsequently, in step S259, first ECU 200 updates, based on the latest detection value by turning motor rotation angle sensor 101, a normal time motor angle θnorm stored in a memory.

That is, when turning motor rotation angle sensor 101 is normal, normal time motor angle θnorm is sequentially updated to a value coinciding with a detection value by turning motor rotation angle sensor 101.

When turning motor rotation angle sensor 101 changes from normal to abnormal, normal time motor angle θnorm indicates a rotation angle detection value of the motor shaft of turning motor 100 before the abnormality of turning motor rotation angle sensor 101 is detected.

Note that, in the update processing for normal time motor angle θnorm in step S259, first ECU 200 can update normal time motor angle θnorm based on an average value of detection results of a plurality of sensors configuring turning motor rotation angle sensor 101, that is, first rotation angle sensor 101a and second rotation angle sensor 101b.

By updating normal time motor angle θnorm based on the average value, first ECU 200 can accurately update normal time motor angle θnorm even if there is, for example, deviation of sampling timings of outputs of two rotation angle sensors 101a and 101b.

Subsequently, in step S260, first ECU 200 calculates an electrical angle θmot_e from motor rotation angle θmot (a mechanical angle).

First ECU 200 proceeds from step S260 to step S272 and calculates, with the vector control scheme, three-phase command voltages Vu, Vv, and Vw for generating a target value (a motor torque command value) of turning torque.

Specifically, first ECU 200 sets d-axis and q-axis command currents according to the target value of the turning torque, converts three-phase current detection values into d-axis and q-axis actual currents based on electrical angle θmot_e, calculates d-axis voltage command value Vd and q-axis voltage command value Vq based on deviations between the d-axis command current and the q-axis command current and the d-axis actual current and the q-axis actual current, and further converts d-axis voltage command value Vd and q-axis voltage command value Vq into three-phase command voltages Vu, Vv, and Vw based on electrical angle θmote.

That is, first ECU 200 executes motor current feedback control for changing three-phase command voltages Vu, Vv, and Vw based on the three-phase current detection values such that a target value of turning torque for causing a turning angle to coincide with a command value can be actually obtained.

Subsequently, in step S273, first ECU 200 determines, with PWM based on three-phase command voltages Vu, Vv, and Vw, a duty ratio for controlling on and off of the switching elements of inverter 712a.

In the next step S274, first ECU 200 outputs, based on electrical angle θmote and the duty ratio, a PWM signal for controlling on and off of the switching elements of inverter 712a.

As a driving method for turning motor 100, first ECU 200 can adopt both of a rectangular wave driving scheme (in other words, a 120-degree energization scheme or a 120-degree phase rectangular wave driving scheme) and a sine wave driving scheme (in other words, a 120-degree phase sine wave driving scheme), which are publicly known.

In the case of the sine wave driving scheme, since motor driving is smoothly performed, vibration from steering device 2000 is suppressed and quietness of vehicle 1 can be secured. On the other hand, in the case of the rectangular wave driving scheme, since a power supply voltage can be used to the maximum degree, large driving torque can be output and controllability of a turning angle is improved.

Figure 9:
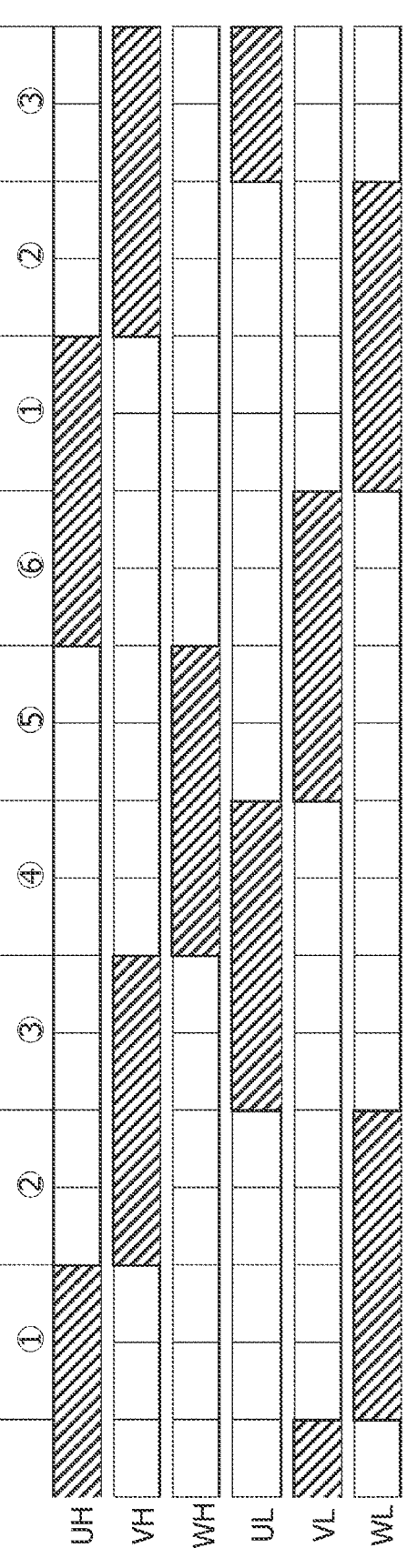
FIG. 9 is a diagram showing an energization pattern in a rectangular wave driving scheme.

FIG. 9 shows switching timings for switching elements of an inverter in the rectangular wave driving scheme.

In the rectangular wave driving scheme, the switching elements are switched in an energization pattern in which, among six switching elements of the inverter (a three-phase bridge circuit), a high side (an upper arm) is off and a low side (a lower arm) is on in a first phase, the low side is off and the high side is on in a second phase, and both the high side and the low side are off in a third phase.

In all the phases, if the high side or the low side is turned on for a period of 120°, both of the high side and the low side are controlled to be off for a period of 60°.

On the other hand, the sine wave driving scheme is a driving scheme for feeding a sine-wave-like current having a 120° phase different to winding wires of three phases (a U phase, a V phase, and a W phase).

It is possible to maximize a motor application voltage by adopting a method for adding a tertiary harmonic to an applied voltage waveform of the sine wave driving scheme (see JP2018-064313 A and the like).

First ECU 200 discriminates ON and OFF of the ignition switch in the next step S275 and, if the ignition switch is on, returns to step S252 and repeatedly executes the control process for turning motor 100, and if the ignition switch is off, ends the control process for turning motor 100.

On the other hand, if an abnormality of turning motor rotation angle sensor 101 is detected in step S257, first ECU 200 proceeds to step S261 and subsequent steps.

As explained below, in step S261 and subsequent steps, first ECU 200 switches the closed-loop control to the open-loop control for controlling energization without using a detection output of turning motor rotation angle sensor 101 and continues the control of turning motor 100.

Therefore, first ECU 200 can continue control of a turning angle even when turning motor rotation angle sensor 101 fails.

Since first ECU 200 switches the closed-loop control to the open-loop control when turning motor rotation angle sensor 101 fails, first ECU 200 can continue the control of the turning angle without multiplexing sensors configuring turning motor rotation angle sensor 101 to three or more sensors. It is possible to suppress an increase in cost of the steer-by-wire system.

As explained in detail below, first ECU 20 properly uses self open-loop control and external open-loop control as the open-loop control according to conditions.

The self open-loop control (self control) is an operation mode for detecting an induced voltage generated in the coil not energized by rotation of a permanent magnet, performing position detection based on the detected induced voltage, and carrying out energization switching.

The external open-loop control (external control) is an open control method for applying a periodic voltage in a feedforward manner irrespective of a magnetic pole position.

In the self open-loop control, when motor rotation stops and the induced voltage is not generated, a rotating position of the motor shaft of turning motor 100 becomes unknown and, as motor rotation speed decreases, the induced voltage drops and estimation accuracy of a rotating position (a rotation angle) is deteriorated.

On the other hand, in the external open-loop control, it is possible to drive to rotate a motor from a stop state.

Therefore, first ECU 200 controls turning motor 100 with the external open-loop control in a low speed region of the motor rotation speed of zero (a motor stop state) to predetermined speed and controls turning motor 100 with the self open-loop control in a high speed region of the motor rotation speed equal to or greater than the predetermined speed.

In the following explanation, the open-loop control in step S261 and subsequent steps is explained in detail.

In step S261, first ECU 200 determines whether first ECU 200 has proceeded to step S261 for the first time after detecting the abnormality of turning motor rotation angle sensor 101, in other words, first ECU 200 performs the open-loop control for the first time after detecting the abnormality of turning motor rotation angle sensor 101.

When first ECU 200 has proceeded to step S261 for the first time after the abnormality detection, first ECU 200 proceeds to step S262 and sets, as an initial value of a failure motor angle $\theta$op, normal time motor angle $\theta$norm, that is, a rotation angle detection value before the abnormality of turning motor rotation angle sensor 101 is detected (in other words, a rotation angle last detected in the normal state of turning motor rotation angle sensor 101).

Note that failure motor angle $\theta$op is information indicating a rotating position of the motor shaft of turning motor 100 instead of a detection value by turning motor rotation angle sensor 101 when turning motor rotation angle sensor 101 becomes abnormal. First ECU 200 switches energization to the coil based on failure motor angle $\theta$op in the external open-loop control.

On the other hand, when first ECU 200 has proceeded to step S261 for the second time, or a greater number of times, rather than the first time after the abnormality detection, first ECU 200 bypasses step S262 and proceeds to step S263.

In step S263, first ECU 200 calculates, based on the information concerning the steering angular velocity of steering wheel 500, motor rotation speed $\omega$op$_{(n)}$ serving as a rotation speed command value in the open-loop control (specifically, the external open-loop control).

That is, first ECU 200 carries out the external open-loop control such that the rotation speed of turning motor 100 is proportional to the steering angular velocity.

Subsequently, in step S264, first ECU 200 calculates to update, based on motor rotation speed $\omega$op$_{(n)}$, failure motor angle $\theta$op, an initial value of which is a rotation angle of the motor shaft detected by turning motor rotation angle sensor 101 before an abnormality is detected.

In step S265, first ECU 200 determines whether motor rotation speed $\omega$op$_{(n-1)}$ is equal to or greater than set rotation speed $\omega$th.

Set rotation speed $\omega$th is rotation speed set based on a lower limit of a rotation speed region in which a magnetic pole position can be estimated in a sensorless manner based on a motor induced voltage. A rotation speed region equal to or greater than set rotation speed $\omega$th indicates that a motor induced voltage having magnitude with which a magnetic pole position (a rotor rotating position) can be estimated with sufficient accuracy is generated.

When motor rotation speed $\omega$op$_{(n-1)}$ is equal to or greater than set rotation speed $\omega$th and a rotation speed condition under which a magnetic pole position can be estimated in a sensorless manner based on the motor induced voltage is satisfied, first ECU 200 proceeds to step S269 and subsequent steps and carries out the self open-loop control.

On the other hand, when motor rotation speed $\omega$op$_{(n-1)}$ is less than set rotation speed $\omega$th and the rotation speed condition under which a magnetic pole position can be estimated in a sensorless manner based on the motor induced voltage is not satisfied, first ECU 200 proceeds to step S266 and subsequent steps and carries out the external open-loop control for switching an electric current to the coil based on information concerning failure motor angle $\theta$op.

Since first ECU 200 sets motor rotation speed $\omega$op$_{(n)}$ based on the information concerning the steering angular velocity of steering wheel 500, first ECU 200 controls turning motor 100 with the external open-loop control when the steering angular velocity is less than predetermined steering angular velocity and controls turning motor 100 with the self open-loop control when the steering angular velocity is equal to or greater than the predetermined steering angular velocity.

When motor rotation speed $\omega$op$_{(n-1)}$ is less than set rotation speed $\omega$th and the external open-loop control is carried out, first, in step S266, first ECU 200 calculates a motor electrical angle $\theta$op_e from failure motor angle $\theta$op.

Subsequently, in step S267, first ECU 200 calculates, based on turning angular velocity based on motor rotation speed $\omega$op$_{(n)}$, vehicle speed of vehicle 1, and an actual turning angle, a target command effective current Icmd of turning motor 100 at the time of the external open-loop control.

First ECU 200 calculates a reference command effective current Iref based on the turning angular velocity, calculates a vehicle speed coefficient Kspd based on the vehicle speed, and further calculates a turning angle coefficient Kstr based on the actual turning angle.

First ECU 200 calculates target command effective current Icmd (a command value of a driving current) according to the following expression based on reference command effective current Iref, vehicle speed coefficient Kspd, and turning angle coefficient Kstr (in other words, based on the turning angular velocity, the vehicle speed, and the actual turning angle).

$$Icmd = Iref \times Kspd \times Kstr$$

Figure 10:
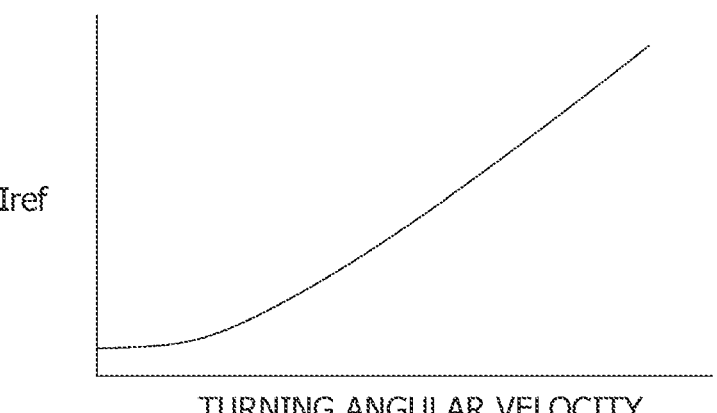
FIG. 10 is a graph showing a correlation between turning angular velocity and a reference command effective current Iref.

FIG. 10 is a graph showing a correlation between the turning angular velocity and reference command effective current Iref. Reference command effective current Iref is set to a greater electric current as the turning angular velocity increases and a request for motor torque increases.

Figure 11:
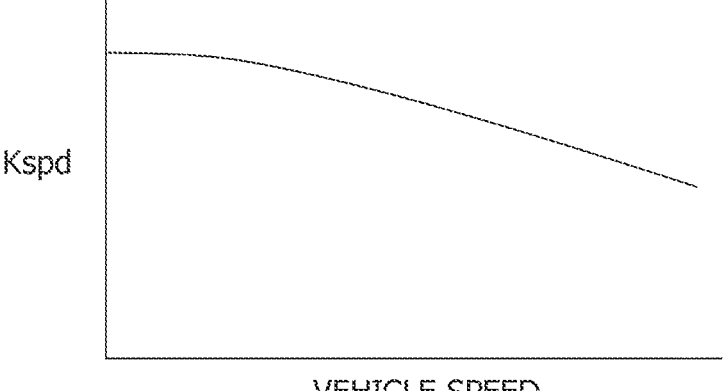
FIG. 11 is a graph showing a correlation between vehicle speed and a vehicle speed coefficient Kspd.

FIG. 11 is a graph showing a correlation between the vehicle speed and vehicle speed coefficient Kspd. Since a turning load increases as the vehicle speed decreases, vehicle speed coefficient Kspd is set to set target command effective current Icmd that is higher as the vehicle speed decreases.

Figure 12:
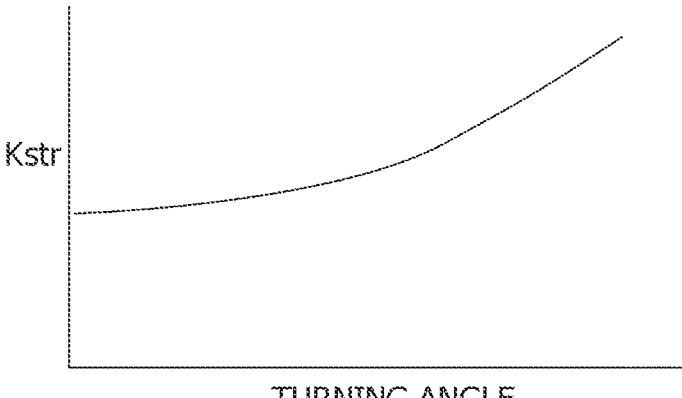
FIG. 12 is a graph showing a correlation between an actual turning angle and a turning angle coefficient Kstr.

FIG. 12 is a graph showing a correlation between the actual turning angle and turning angle coefficient Kstr. Since a turning load increases as the actual turning angle increases, turning angle coefficient Kstr is set to set target command effective current Icmd that is higher as the actual turning angle increases.

If target command effective current Icmd is set as explained above, it is possible to control turning motor 100 without causing turning motor 100 to step out while improving flowability.

Note that first ECU 200 can variably set target command effective current Icmd based on at least one of the turning angular velocity, the vehicle speed, and the actual turning angle.

Subsequently, in step S268, first ECU 200 calculates a command voltage value such that an actual current value approaches target command effective current Icmd (the command current value).

First ECU 200 proceeds from step S268 to step S273 and calculates, based on the command voltage value, a duty ratio in driving on and off of the switching elements of inverters 212a and 212b.

Furthermore, in step S274, first ECU 200 outputs a PWM signal (in other words, a gate signal) for turning on and off the switching elements of inverters 212a and 212b according to the duty ratio in synchronization based on motor electrical angle θop_e.

Note that, when the absolute value of the difference between the turning angle command value and the actual turning angle is equal to or less than a predetermined value in the external open-loop control in step S267 and step S268, first ECU 200 ends the feedback control and reduces an electric current flowing to turning motor 100 to a predetermined current value.

FIGS. 13 to 18 show a correlation between an energization phase in the rectangular wave driving scheme and a stable angle of the rotor.

Figure 13:
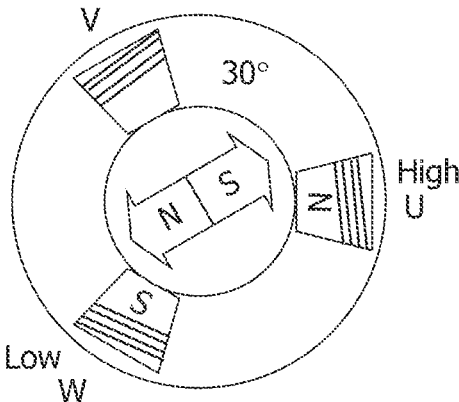
FIG. 13 is a diagram showing a rotor angle at the time when an electric current is fed from a U phase to a W phase.
Figure 14:
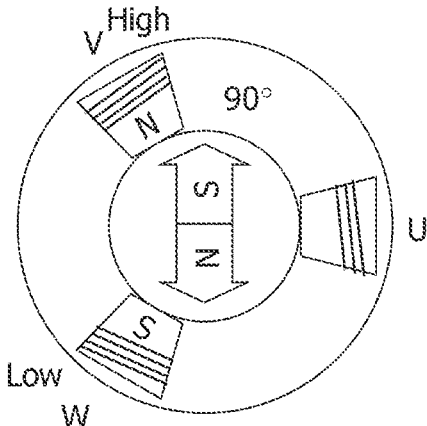
FIG. 14 is a diagram showing a rotor angle at the time when an electric current is fed from a V phase to the W phase.
Figure 15:
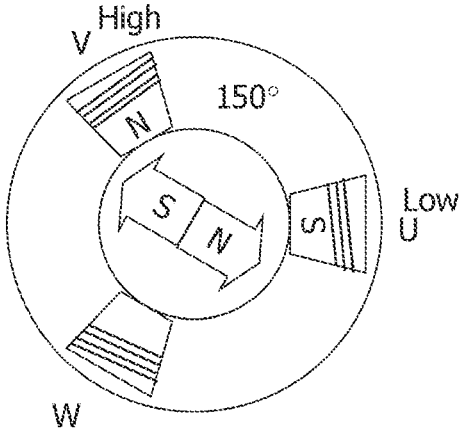
FIG. 15 is a diagram showing a rotor angle at the time when an electric current is fed from the V phase to the U phase.
Figure 16:
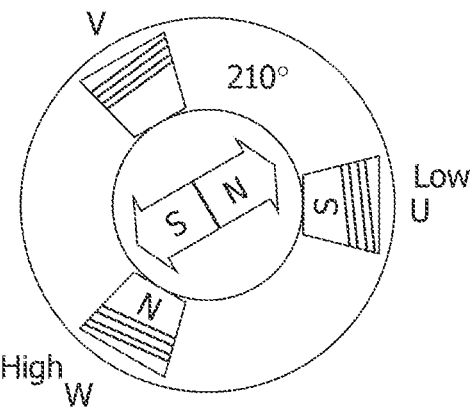
FIG. 16 is a diagram showing a rotor angle at the time when an electric current is fed from the W phase to the U phase.
Figure 17:
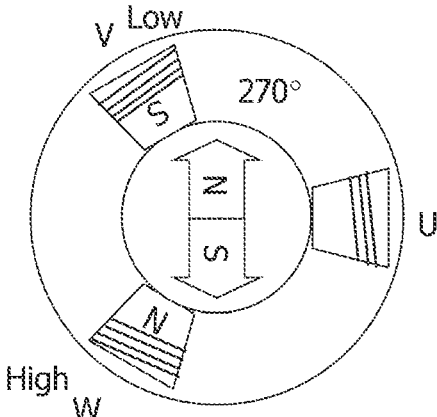
FIG. 17 is a diagram showing a rotor angle at the time when an electric current is fed from the W phase to the V phase.
Figure 18:
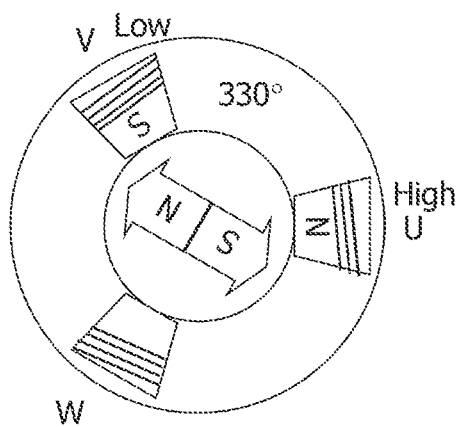
FIG. 18 is a diagram showing a rotor angle at the time when an electric current is fed from the U phase to the V phase.

For example, when a state in which an electric current is fed from the U phase to the W phase is continued as shown in FIG. 13, the rotor stabilizes in the position of 30°. Conversely, when a state in which an electric current is fed from the W phase to the U phase is continued as shown in FIG. 16, the rotor stabilizes in the position of 210°.

Figure 19:
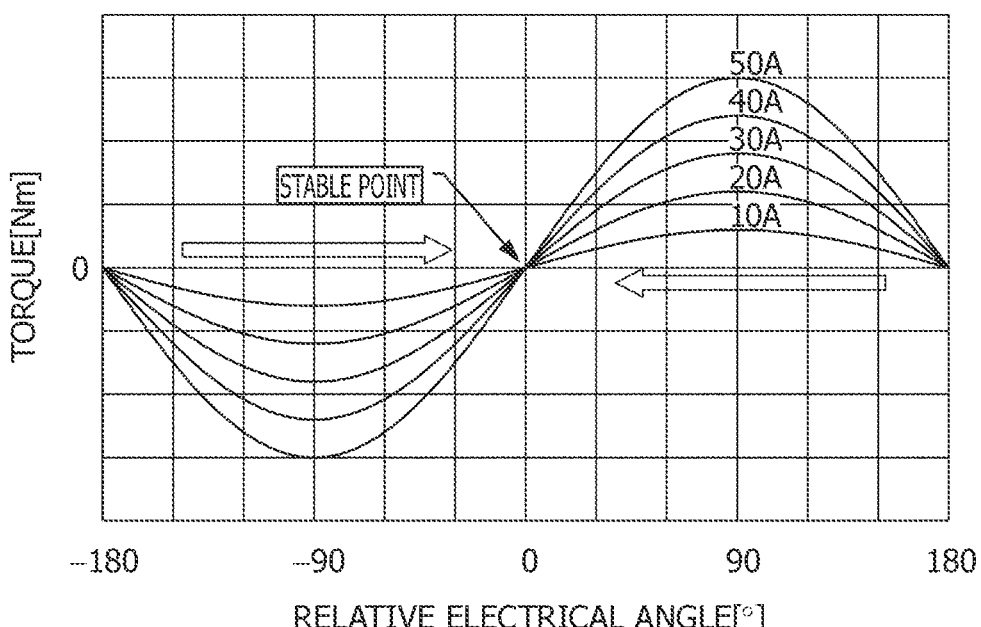
FIG. 19 is a graph showing a correlation between the magnitude of an electric current and the magnitude of torque generated toward a stable angle of a rotor.

FIG. 19 is a graph showing a correlation between the magnitude of an electric current and the magnitude of torque generated toward the stable angle of the rotor.

For example, when a constant current is fed from the U phase to the W phase, torque toward the position of 30° is generated if the position of the rotor deviates from the position of 30°, which is the stable angle, and the rotor rotates to the position of 30°, which is the stable angle, and stabilizes.

The torque toward the position of 30° increases as an electric current fed to the coil increases.

Therefore, when the absolute value of the difference between the turning angle command value and the actual turning angle is equal to or less than the predetermined value in the external open-loop control in step S267 and step S268, first ECU 200 reduces the electric current fed to turning motor 100 to a predetermined current value with which the position of the rotor can be maintained and continues to feed the electric current to the same two phases.

Consequently, it is possible to suppress power consumption when the turning angle command value and the actual turning angle substantially coincide and it has become unnecessary to change the turning angle (in other words, when a fixed turning angle is maintained).

Next, the self open-loop control in step S269 and subsequent steps is explained.

Note that, in the self open-loop control in step S269 and subsequent steps, first ECU 200 switches energization to the coil using an estimation value of a motor rotation angle based on a motor induced voltage instead of a detection output of turning motor rotation angle sensor 101.

In step S269, first ECU 200 calculates a motor electrical angle θemf_e based on an induced voltage.

Specifically, since an induced voltage due to rotation of a permanent magnet appears in a terminal of an unenergized phase among the three phases, first ECU 200 detects a zero cross point of the induced voltage to detect the position of the motor.

Subsequently, in step S270, first ECU 200 calculates, based on failure motor angle θop updated based on motor rotation speed $\omega op_{(n)}$ and motor electrical angle θemf_e estimated from the induced voltage, a turning angle deviation for causing the motor to follow motor rotation speed $\omega op_{(n-1)}$ corresponding to the steering angular velocity of steering wheel 500 and calculates a target value of turning torque such that the turning angle deviation approaches zero.

In step S271, first ECU 200 updates a value of electrical angle θmot_e to a value of motor electrical angle θemf_e based on the induced voltage.

Subsequently, first ECU 200 proceeds to step S272, and as explained above, calculates, with the vector control scheme, three-phase command voltages Vu, Vv, and Vw for generating a target value of turning torque (a motor torque command value).

Note that, in the self open-loop control, first ECU 200 can calculate the target value of the turning torque based on a deviation between information concerning the turning angle command value and information concerning the actual turning angle.

That is, in the self open-loop control, first ECU 200 can adopt the same control method as the control method of the closed-loop control as a control method for an applied voltage, although a detection method for a rotation angle of the motor shaft is different from the detection method of the closed-loop control.

In the open-loop control (the external open-loop control and/or the self open-loop control), first ECU 200 can calculate a rotation speed command value of turning motor 100 based on the deviation between the information concerning the turning angle command value and the information concerning the actual turning angle, set a voltage command value according to the rotation speed command value, and apply a voltage to turning motor 100 based on the voltage command value.

In such open-loop control, first ECU 200 sets the absolute value of the rotation speed command value of turning motor 100 to be greater as the absolute value of the deviation between the information concerning the turning angle command value and the information concerning the actual turning angle increases.

In this case, since the rotation speed command value is set according to the deviation between the information concerning the turning angle command value and the information concerning the actual turning angle, it is possible to maintain predetermined responsiveness.

The technical concepts described in the above embodiment may be used in combination as necessary, as long as no conflict arises.

Also, while the details of the present invention are specifically described referring to the preferred embodiment, it is obvious for one skilled in the art to be able to make various modifications on the basis of the basic technical concept and teachings of the present invention.

For example, steer-by-wire system 1000 may include one electronic control device including both of the control function of first ECU 200 and the control function of second ECU 700.

First ECU 200 may directly acquire a detection output signal of steering angle sensor 800 included in reaction generation device 3000.

Turning motor rotation angle sensor 101 may be configured by one sensor without redundancy or may be a redundant configuration including three or more sensors.

The control system of first ECU 200 and/or second ECU 700 may be configured by one control system without redundancy or may be a redundant system including three or more control systems.

REFERENCE SYMBOL LIST

1 Vehicle
2L, 2R Steered wheel
100 Turning motor
101 Turning motor rotation angle sensor
200 First ECU (Vehicular steering control device)
500 Steering wheel
1000 Steer-by-wire system
1100 Control device
2000 Steering device
3000 Reaction generation device

The invention claimed is:

1. A vehicular steering control device of a steer-by-wire system, the steer-by-wire system including:

a reaction generation device capable of applying reaction torque to a steering wheel by actuating a reaction motor;

a steering device that is mechanically separated from the reaction generation device and is capable of steering a steered wheel by actuating a turning motor; and a turning motor rotation angle sensor capable of detecting a rotation angle of a motor shaft of the turning motor, and the vehicular steering control device, if an abnormality of the turning motor rotation angle sensor is detected, performing open-loop control on the turning motor based on information concerning the reaction generation device.

2. The vehicular steering control device according to claim 1, wherein if abnormality of the turning motor rotation angle sensor is detected, further performing open-loop control on the turning motor based on a rotation angle of the motor shaft of the turning motor before the abnormality of the turning motor rotation angle sensor is detected.

3. The vehicular steering control device according to claim 2, wherein the open-loop control is self open-loop control or external open-loop control.

4. The vehicular steering control device according to claim 3, wherein the reaction generation device is capable of detecting steering angular velocity of the steering wheel, and the vehicular steering control device performs the external open-loop control when the steering angular velocity is less than predetermined steering angular velocity, and performs the self open-loop control when the steering angular velocity is equal to or greater than the predetermined steering angular velocity.

5. The vehicular steering control device according to claim 3, wherein the reaction generation device is capable of detecting steering angular velocity of the steering wheel, and the vehicular steering control device performs control such that rotation speed of the turning motor is proportional to the steering angular velocity.

6. The vehicular steering control device according to claim 3, wherein the steering device is capable of detecting an actual turning angle of the steered wheel, the reaction generation device is capable of detecting a steering angle of the steering wheel, and the vehicular steering control device calculates a turning angle command value from the steering angle, and calculates rotation speed of the turning motor according to a difference between the turning angle command value and the actual turning angle to perform control.

7. The vehicular steering control device according to claim 3, wherein a driving method for the turning motor is a 120-degree phase sine wave driving scheme.

8. The vehicular steering control device according to claim 3, wherein a driving method for the turning motor is a 120-degree phase rectangular wave driving scheme.

9. The vehicular steering control device according to claim 3, wherein the steering device is capable of detecting an actual turning angle of the steered wheel, and the vehicular steering control device controls a driving current of the turning motor based on at least one of vehicle speed, the actual turning angle, and turning angular velocity.

10. The vehicular steering control device according to claim 2, wherein the steering device is capable of detecting an actual turning angle of the steered wheel, the reaction generation device is capable of detecting a steering angle of the steering wheel, and the vehicular steering control device calculates a turning angle command value from the steering angle, and when an absolute value of a difference between the turning angle command value and the actual turning angle is equal to or less than a predetermined value, ends feedback control for a turning angle, and reduces an electric current flowing to the turning motor to a predetermined current value.

11. The vehicular steering control device according to claim 2, wherein the reaction generation device and the vehicular steering control device are made redundant, respectively.

12. The vehicular steering control device according to claim 2, wherein the turning motor rotation angle sensor includes a plurality of motor rotation angle sensors, each of which detects a motor rotation angle, which is a rotation angle of the motor shaft.

13. The vehicular steering control device according to claim 12, wherein the vehicular steering control device compares values of the plurality of motor rotation angle sensors to detect an abnormality of the turning motor rotation angle sensor.

14. The vehicular steering control device according to claim 12, wherein the vehicular steering control device uses an average value of values of the plurality of motor rotation angle sensors as a rotation angle of the motor shaft of the turning motor before the abnormality of the turning motor rotation angle sensor is detected.

15. The vehicular steering control device according to claim 2, wherein the steering device includes a turning angle sensor capable of detecting an actual turning angle of the steered wheel, the reaction generation device includes a steering angle sensor capable of detecting a steering angle of the steering wheel, and the vehicular steering control device calculates a turning angle command value from the steering angle, and performs feedback control on the turning motor such that the actual turning angle approaches the turning angle command value.

16. The vehicular steering control device according to claim 15, wherein the steering device steers the steered wheel according to a movement amount of a rack by actuation of the turning motor, and the turning angle sensor is a stroke sensor for detecting the movement amount of the rack.

17. The vehicular steering control device according to claim 15, wherein the steering device steers the steered wheel according to a movement amount of a rack that meshes with a pinion that is driven to rotate by the turning motor, and the turning angle sensor is a pinion angle sensor for detecting an angle of the pinion.

18. A steer-by-wire system comprising:

a reaction generation device capable of applying reaction torque to a steering wheel by actuating a reaction motor;

a steering device that is mechanically separated from the reaction generation device and is capable of steering a steered wheel by actuating a turning motor; and a vehicular steering control device capable of controlling the steering device and the reaction generation device, wherein the steering device includes a turning motor rotation angle sensor capable of detecting a rotation angle of a motor shaft of the turning motor, and the vehicular steering control device, if an abnormality of the turning motor rotation angle sensor is detected, performs open-loop control on the turning motor based on information concerning the reaction generation device.

19. A method for controlling a steer-by-wire system, the steer-by-wire system including:

a reaction generation device capable of applying reaction torque to a steering wheel by actuating a reaction motor; and a steering device that is mechanically separated from the reaction generation device and is capable of steering a steered wheel by actuating a turning motor, the steering device including a turning motor rotation angle sensor capable of detecting a rotation angle of a motor shaft of the turning motor, the method comprising the steps of:

determining whether there is an abnormality in the turning motor rotation angle sensor;

if there is no abnormality in the turning motor rotation angle sensor, performing closed-loop control on the turning motor based on a value of the turning motor rotation angle sensor; and if there is an abnormality in the turning motor rotation angle sensor, performing open-loop control on the turning motor based on information concerning the reaction generation device.

\* \* \* \* \*